(No Model.)
A. DREW.
COUPLING POLE.
No. 482,678.  Patented Sept. 13, 1892.
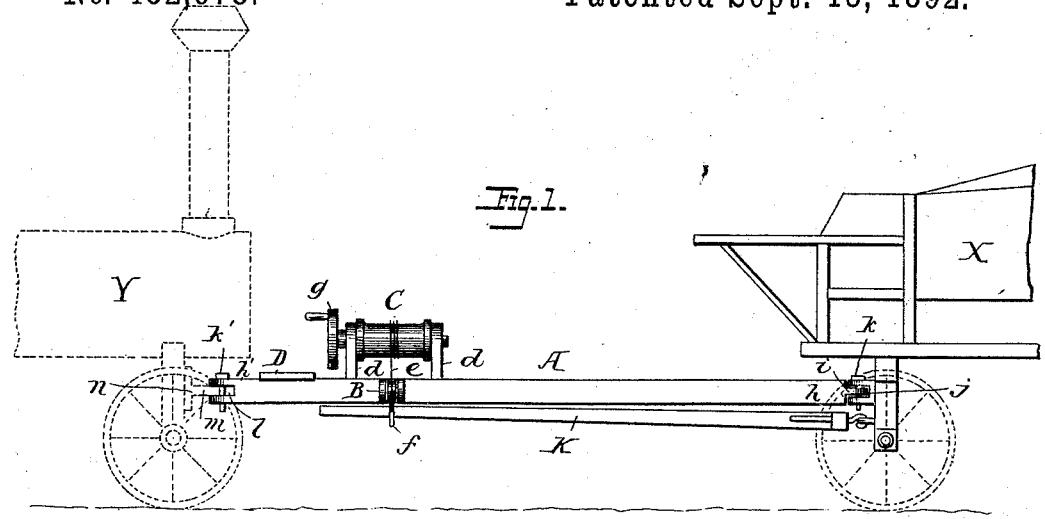
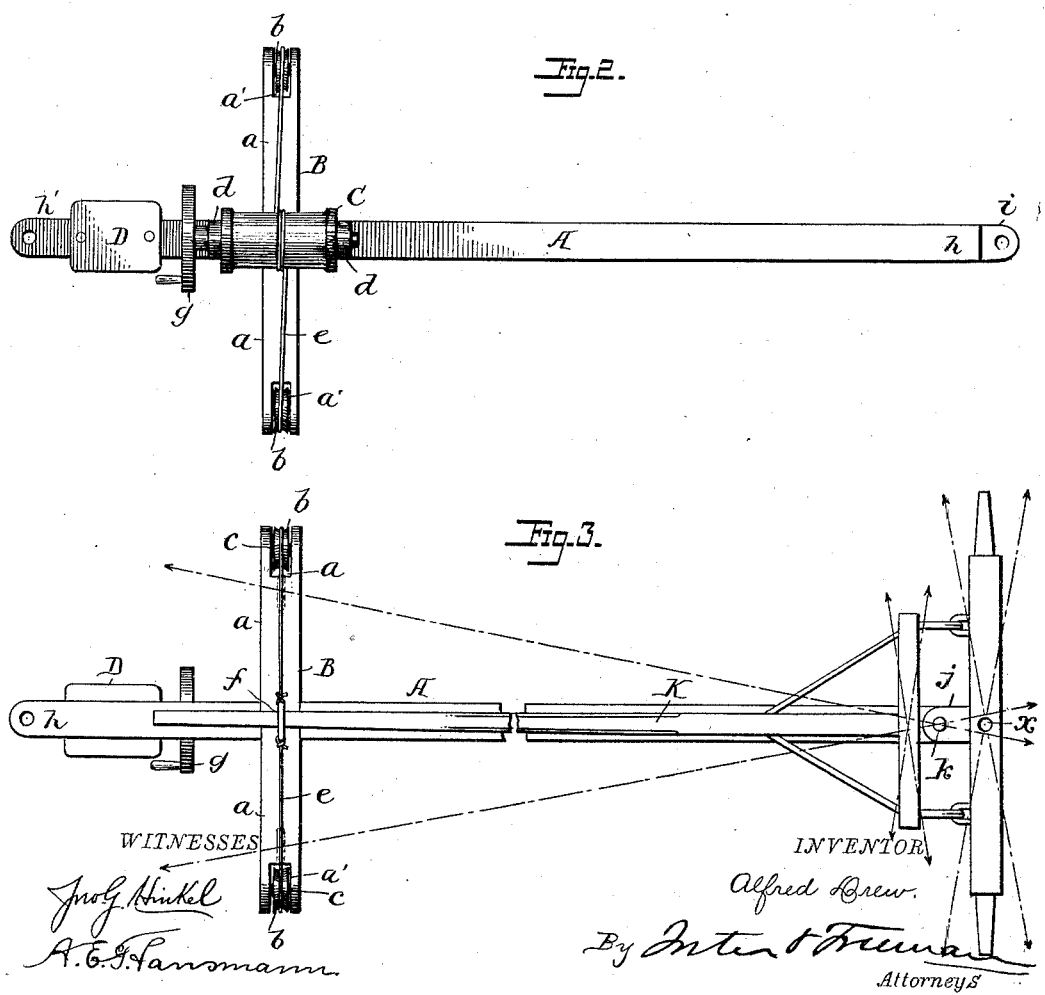
WITNESSES
Jno G. Hinkel
A. E. J. Hansmann
INVENTOR
Alfred Drew
By Interr & Freeman
Attorneys

UNITED STATES PATENT OFFICE.

ALFRED DREW, OF DE LISLE, OHIO.

COUPLING-POLE.

SPECIFICATION forming part of Letters Patent No. 482,678, dated September 13, 1892.

Application filed October 2, 1891. Renewed August 15, 1892. Serial No. 443,075. (No model.)

*To all whom it may concern:*

Be it known that I, ALFRED DREW, a citizen of the United States, residing at De Lisle, in the county of Darke and State of Ohio, have invented certain new and useful Improvements in Coupling-Poles, of which the following is a specification.

The object of my invention is to provide a simple, convenient, and inexpensive coupling-pole for connecting together two vehicles arranged in line one behind the other, or more particularly for coupling a wagon or agricultural machine to a traction-engine, so as to be moved from place to place by the latter, the coupling-pole having means thereon for readily and quickly adjusting the usual tongue or shaft of the vehicle or machine laterally to properly direct and control its movements.

To this end the invention consists in a detachable coupling-pole constructed as hereinafter described, and illustrated in the accompanying drawings, in which—

Figure 1 is a side view of a coupling-pole embodying my invention and shown as connecting a thrashing or other similar machine to a traction-engine. Fig. 2 is a plan view of the coupling-pole detached, and Fig. 3 is an inverted plan view showing the relative arrangement of the coupling-pole and the tongue of the vehicle or machine to which the pole is attached.

The coupling-pole may be constructed of wood or metal, as desired; but, as shown, it is made of stout pieces of timber, and consists of a body portion A, of suitable length, and lateral arms $a\ a$, preferably formed by a cross-piece B, firmly secured to the body near one end thereof. This cross-piece may be provided at its outer ends with any suitable guides; but, as preferred, it has recesses or slots $a'\ a'$ for the reception of guide-pulleys $b\ b$, rotatively mounted upon cross-pins $c\ c$, while the ends of the body A may be connected in any convenient manner to the vehicles or the traction-engine and machine to be coupled together.

A winding-drum C is journaled above the arms or cross-piece in bearings at the upper ends of standards $d\ d$, rising from the body of the pole, and a chain or rope $e$, preferably having a ring $f$ in the line thereof, passes along the under side of the cross-piece over the end guides or pulleys $b\ b$, and is wound in opposite directions upon the drum, a hand-wheel $g$ or other device at one end of the drum-shaft serving as a means for rotating the latter, as desired.

A foot-board or platform D is arranged upon the pole adjacent to the hand-wheel $g$ for the person operating the drum to stand upon.

Although the coupling-pole may have any suitable connecting means at its ends. The end $h$ thereof, as best seen in Fig. 1, is provided with a lip $i$, adapted to engage a stirrup $j$, secured to the front bolster or other portion of a vehicle or thrashing-machine X, a bolt or pin $k$ passing through the parts and detachably locking them together. The opposite end $h'$ of the pole is preferably slotted at $l$ to engage the end $m$ of a bracket or coupling-head $n$ on the traction-engine Y, a pin $k'$ likewise securing the pole to said head.

When the coupling-pole is adjusted to position ready for service, the usual tongue of the vehicle or thrashing-machine X is below the pole, and the outer or free end of the tongue extends through the ring $f$, arranged in the line of the rope $e$. If now the thrashing-machine is moved forward or backward by the traction-engine, it may be easily and properly guided by turning the drum to wind thereon one end or the other of the rope $e$, thereby drawing the tongue to either side, as required, and clearly indicated by dotted lines in Fig. 3. By this means the machine may be accurately directed and controlled in its movements by a person on the platform D.

In some instances, where it is necessary or desirable to make sharp turns with the vehicle or machine X, the position of the coupling-pole may be reversed to bring the drum and related parts closer to said machine, the relative arrangement in other respects being the same as described. An increased lateral movement of the tongue may then be secured, inasmuch as the adjusting mechanism on the pole is comparatively near the center $x$, on which the front axle of the vehicle or machine swings, as will be understood.

It will be seen that the improved coupling-pole may be adjusted to position with facility when required for service and that it may be readily detached and removed when no longer needed. It will also be noticed that, although the device is simple in construction and operation, it is very useful for the purpose intended and constitutes a convenient means by which heavy wagons or thrashing and other similar machines may be connected to and backed or drawn from place to place by a traction-engine and guided in their movements. Moreover, the coupling-pole may in like manner be used to advantage in coupling ordinary wagons or vehicles together, where arranged one behind the other, to be moved about in train form.

Without limiting myself to the exact construction shown, I claim—

1. A coupling-pole for detachably connecting two vehicles arranged one behind the other, consisting of a body portion, arms extending laterally therefrom, a winding-drum, and a chain or rope guided by said arms and wound in opposite directions upon the drum, said chain or rope adapted to engage the tongue of one of the vehicles, substantially as described.

2. A coupling-pole for detachably connecting two vehicles arranged one behind the other, consisting of a body portion, laterally-extending arms near one end thereof, guides at the ends of the arms, a winding-drum, and a chain or rope passing over said guides and wound in opposite directions upon the drum, said chain or rope adapted to engage the tongue of one of the vehicles, substantially as described.

3. A coupling-pole for detachably connecting two vehicles arranged one behind the other, consisting of a body portion, lateral arms having guide-pulleys at their ends, a winding-drum mounted in standards above the arms, a hand-wheel, a chain or rope passing over said pulleys and wound in opposite directions upon the drum, and a ring on the chain or rope adapted to receive the tongue of one of the vehicles, substantially as described.

4. A coupling-pole for detachably connecting two vehicles arranged one behind the other, consisting of a body, arms extending laterally from the body near one end, guide-pulleys on the arms, standards, a drum and hand-wheel carried by the standards, a chain or rope passing over the pulleys and wound in opposite directions upon the drum, a ring on the chain or rope to receive the tongue of one of said vehicles, and a platform on the pole-body adjacent to the hand-wheel, substantially as described.

In testimony whereof I have signed my name to this specification in the presence of two subscribing witnesses.

ALFRED DREW.

Witnesses:
FRANK BROWN,
ALFRED TOWNSEND.